United States Patent [19]

Crnojevich et al.

[11] 4,214,900
[45] Jul. 29, 1980

[54] PRODUCTION OF NONFERROUS METALS WITH LOW SELENIUM CONTENTS

[75] Inventors: Ranko Crnojevich, Gretna; Edward I. Wiewiorowski, New Orleans; Peter H. Yu, Harvey, all of La.

[73] Assignee: Amax Inc., Greenwich, Conn.

[21] Appl. No.: 64,689

[22] Filed: Aug. 8, 1979

[51] Int. Cl.$^2$ .............................................. C22B 23/04
[52] U.S. Cl. ........................................ 75/109; 75/117; 75/119; 75/121; 423/509; 423/510
[58] Field of Search ................. 75/109, 117, 119, 121; 423/510, 509

[56] References Cited

U.S. PATENT DOCUMENTS

| | | | |
|---|---|---|---|
| 3,914,375 | 10/1975 | Clark et al. ......................... | 75/121 X |
| 3,933,635 | 1/1976 | Marchant ............................ | 75/121 X |
| 3,959,097 | 5/1976 | Queneau et al. .................... | 75/121 X |
| 4,026,797 | 5/1977 | Nikolec et al. ..................... | 75/121 X |
| 4,047,939 | 9/1977 | Morrison ............................ | 75/109 X |
| 4,076,605 | 2/1978 | Bilson ................................ | 75/117 X |

*Primary Examiner*—G. Ozaki
*Attorney, Agent, or Firm*—Michael A. Ciomek

[57] ABSTRACT

Selenium is precipitated from solutions or slurries containing nonferrous metals, particularly nickel by contacting the solution or slurries with a semimetallic chromous precipitant of the nonferrous metal, particularly nickel, which has a nonferrous metal to chromium ratio between about 10:1 and about 200:1 and which has a metallic content between about 50% and about 90%. The semimetallic chromous precipitant of the nonferrous metal is prepared by hydrogen reducing a solution of the nonferrous metal or slurries containing chromous salts in amount to provide the aforementioned nickel to chromium ratios.

10 Claims, No Drawings

PRODUCTION OF NONFERROUS METALS WITH LOW SELENIUM CONTENTS

THEORY OF THE INVENTION

The present invention relates to hydrometallurgy, and more particularly to the removal of selenium from nickel-containing solutions.

BACKGROUND OF THE INVENTION

Many alloying uses of metallic nickel require high purity. This is particularly true when metallic nickel is used in forming superalloys. Small amounts of impurities, e.g. tens of parts per or even parts per million, can produce highly detrimental properties. For example, sulfur in amounts greater than 50 parts per million and selenium in evan smaller amounts, i.e., more than about 2 parts per million, can induce hot shortness in superalloys, causing problems during hot working. Metallic nickel can be produced by electrorefining, electrowinning, carbonyl techniques and by precipitation of metallic nickel with a reducing gas from aqueous solutions. The first three of these processes can generally produce a refined nickel product that contains less than 5 ppm selenium. Metallic nickel precipitated from aqueous solutions generally contains about 5 ppm and 40 ppm selenium, and most often between about 10 ppm and about 20 ppm selenium. But even 1 ppm selenium in nickel can be critically detrimental when the nickel is used in the production of special superalloys.

Some selenium is removed by partial volatilization when nickel is produced with intermediate pyrometallurgical treatments. Selenium can also be partially removed by coprecipitation with other hydroxide when iron is precipitated from solutions under oxidizing conditions in a pH range between about 4 and 6. Some selenium can also be removed by cementation with metallic copper at moderate temperatures and with metallic nickel at temperatures above about 200° C. Some selenium can also be removed from nickel solutions with ferric hydroxide produced by hydrolysis at temperatures above 200° C.

These known processes for removing selenium from nickel solutions are very expensive, only partially effective or inapplicable. For example, those processes that require the use of temperatures of 200° C. are frequently commercially unattractive because such reactions require the use of pressurized vessels in a large production stream, can entail the loss of nickel from solution or are effective in removing only selenium that is present in the tetravalent state. These known processes which rely on the coprecipitation of selenium with hydrolyzed ferric hydroxide or other hydroxides are not applicable to the treatment of pure nickel solutions because either these solutions do not contain the coprecipitating compound or are effective in only removing tetravalent selenium. A process for removing both tetravalent and hexavalent selenium from nickel solutions under moderate operating conditions has now been discovered.

BRIEF DESCRIPTION OF THE INVENTION

Broadly stated, the present invention provides a process for precipitating selenium from a solution or a slurry of at least one nonferrous metal selected from the group consisting of cobalt, copper and nickel. The process comprises contacting the solution-slurry with a semimetallic chromous precipitant of the nonferrous metal which has a nonferrous metal to chromium ratio between about 10:1 and about 200:1 and which has a metallic content between about 50% and about 90% to precipitate selenium from the solution or slurry as a selenide of the nonferrous metal. The semimetallic chromous precipitant will be referred to herein as "SRC" standing for "Selenium Removal Compound".

DETAILED DESCRIPTION OF THE INVENTION

Aqueous solutions of at least one nonferrous metal selected from the group consisting of cobalt, copper and nickel can be treated for selenium removal by the process of the present invention. However, the process will be described in conjunction with the treatment of nickel-containing solution in order to facilitate the description thereof. Many nickel containing solutions can be treated by the process in accordance with the present invention. Thus, nickel chloride, nickel sulfate, nickel amine sulfate solutions can be treated to remove selenium by the process in accordance with the present invention. Advantageously as mostly required in the commercial practice, nickel sulfate solutions are treated to precipitate selenium in accordance with the present invention. Nickel solutions that can be treated will generally have nickel concentrations between about 10 gpl and about 120 gpl and between about 2 ppm and 25 ppm, or even 40 ppm, selenium, and most often between about 3 ppm and about 6 ppm selenium. Although the nickel solutions can have a wide range of pH values, it is advantageous to maintain the nickel solution at a pH value between about 0.5 and about 7.0, and advantageously between about 1.5 and about 6.0.

Selenium is removed from nickel solutions or slurry by contacting the solution or slurry with a semimetallic nickel chromous precipitant which has a nickel to chromium ratio between about 10:1 and about 200:1 and which has a metallic content between about 50% and about 90%. The precipitant is prepared by treating nickel-bearing solutions or slurries or combinations thereof containing sufficient amounts of chromous salts dissolved in the aqueous phase to produce the aforementioned nickel to chromium ratios. Thus, the precipitant can be produced from solutions containing nickel sulfate, nickel ammine sulfate [Ni(NH$_3$)]SO$_4$, where X=2-6 or slurries containing nickel hydroxide or basic nickel sulfate, nickel carbonates or basic nickel carbonate. Chromium or chromous compounds that can be employed include chromous sulfate (CrSO$_4$), Cr (II) halogenides, Cr (II) oxides or hydroxides, Cr(II) salts or organic acids and Cr(II) sulfides, etc. The nickel solution or slurry containing the chromous salt is treated with carbon monoxide or hydrogen, advantageously hydrogen, at a temperature between about 50° C. and about 200° C. advantageously between about 80° C. and about 100° C. using a reducing gas overpressure between about 100 pounds per square inch gauge (psig) and about 800 psig, advantageously between about 300 psig and about 600 psig for a time between about 5 minutes and about 45 minutes. Through reduction of the liquor solution or slurry containing a chromous salt the following reaction occurs:

where Me is nickel and chromium, A is either an acid anion or the hydroxyl anion and R is the reducing gas. If A is an acid anion, as the reaction proceeds a required amount of a neutralizing reagent, generally ammonia, should be supplied to neutralize acid generated by the reaction.

Reduction of the nickel solution or slurry containing the chromous salt produces a finely divided semimetallic nickel chromium precipitant having a very large surface area and a low density but is fast settling. This precipitant is superior to metallic nickel or other metallics not only chemically but also physically because it is very suitable for transporting in a slurry form with common pumping apparatus and can be easily suspended during selenium removal. The semimetallic nickel chromium precipitant is a mixture of metallic nickel and chromium and hydroxides and basic sulfates of these two elements. The degree of metallization of the precipitant is determined by analyzing for the total nickel content and then subtracting the amount of nickel contained in the precipitant from the total weight thereof. The difference between the total weight of the precipitant and the total weight of nickel is basically the weight of the hydroxyl or acid anions associated with the nickel and chromium ions.

The effectiveness of semimetallic nickel chromous precipitant can be further improved by adding small amounts of various reagents to the nickel-containing solution or slurry during the preparation of the precipitant. Reagents that improve the effectiveness of the precipitant include ferric ions, aluminum ions, silver ions, sulfide ions, cyanide ions, alizarin, polyacrylic acids and anthraquinone. These reagents can be added to the nickel slurry in amounts between about 50 ppm and about 200 ppm based on the weight of the nickel in solution or in the slurry. The reagents improve the effectiveness of the precipitant by providing a consistent quality in the precipitant and/or developing a higher surface area for the precipitant.

The semimetallic nickel chromium precipitant can be used directly as made up slurry for selenium removal or can be dewatered (densified) or washed prior to its use. Also before use, the semimetallic nickel chromium precipitant can be dried, providing that drying and storage is done in a reducing atmosphere. Advantageously, the semimetallic nickel chromous precipitant is only dewatered (densified) and used as such.

As noted hereinbefore the semimetallic nickel chromous precipitant can be used for treating most nickel solutions. However, it is particularly advantageous to use the precipitant for purifying nickel solutions produced by a sulfuric acid leaching operation in which the first stage is an atmospheric leach and followed by superatmospheric leaches. Nickel copper matte is atmospherically leached with an acidic sulfate solution containing nickel and substantial amounts of copper to dissolve a substantial part of the nickel contained in the matte while cementing copper from solution and consuming free acid contained in the leaching solution to produce a substantially purified nickel sulfate solution and a residue containing cement copper, hydroxides precipitated during the leaching operation, and unleached material. The residue is subjected to superatmospheric leaching with aeration with an acidic solution containing substantial amounts of free acid to dissolve most of the nickel and copper remaining in the residue. The residue from the first stage pressure leaching operation is then subjected to more severe acid leaching to produce a copper sulfate solution containing any of the undissolved nickel values in the residue from the first stage pressure leaching operation. The pregnant solution from the second stage pressure leaching operation is sent to a tank house where copper is electrowon from the solution and the spent electrolyte is then recycled to the atmospheric leach and the pressure leaching operation.

Selenium is preferentially removed from the nickel solution either during the atmospheric leaching operation or after the atmospheric leaching operation is completed. Although selenium removal can be conducted during the atmospheric leaching, it is advantageous to remove selenium as a separate operation because the oxidizing conditions employed during atmospheric leaching result in a slightly higher consumption of the semimetallic nickel chromous precipitant. But, selenium removal can be carried out in the solutions or slurries following the pressure leach operation.

Selenium removal can be conducted at ambient pressures with mild agitation at temperatures from room temperature to the boiling point of the solution. However, the kinetics of selenium removal are improved by operating at temperatures between about 60° C. and about 90° C. The semimetallic nickel chromium precipitant has a low density; only mild agitation is required to keep the precipitant satisfactorily suspended in the reaction system. The low density of the precipitant minimizes the build-up of the precipitant on the bottom of the reaction vessel or the plugging of lines as is generally experienced with other metallic precipitants. Selenium removal can be completed in as short a time as one hour, advantageously between about one hour and about four hours.

Selenium can be removed from nickel solutions having pH values between about 1 and 8 but is advantageously carried out in nickel solutions that are slightly acidic, i.e., having pH values between about 1.5 and about 6.0. The amount of the semimetallic nickel chromous precipitant added to the nickel solution is mainly dependent upon the amount of selenium contained in the solution and to a far lesser extent on other process variables like temperature, reaction time, oxidizing conditions, pH value, etc. At selenium concentrations between about 1 part per million and about 5 part per million, about 1 gram per liter of metallics in the semimetallic nickel chromium precipitant is required per ppm of selenium to be removed. For nickel solutions containing more than 5 ppm of selenium, the rate of addition of the semimetallic nickel chromium precipitant that must be added to the nickel solution is decreased and about 0.5 gram per liter per ppm selenium is required for the solutions containing more than 10 ppm. selenium. Because the amount of the precipitant required is dependent not only on the amount of selenium in solution but other process variables, it is advantageous to ascertain by tests that level of precipitant additions that will lower the selenium content to the desired levels.

In order to give those skilled in the art a better understanding of the advantages flowing from the present invention, the following illustrative examples are given:

EXAMPLE I

Three semimetallic nickel chromous precipitants were prepared under different conditions and these were compared with known means of removing selenium from nickel-containing solutions. In Test No. 1 the semimetallic nickel chromous precipitant was precipitated from a nickel sulfate solution containing 80 grams per liter nickel and one gram per liter $Cr^{2+}$ ions at 90°

C. for 30 minutes under a hydrogen overpressure of 500 psig. This precipitant contained 75.6% metallics. A second precipitant was prepared by reducing a slurry containing 100 grams per liter nickel as basic nickel sulfate and containing one gram per liter $Cr^{2+}$ ions at 90° C. for 1 hour under a hydrogen overpressure of 500 psig. Precipitants produced under these conditions contained 78.6% metallics. In Test No. 3, the precipitant was prepared by reducing a slurry of basic nickel carbonate having a nickel content equivalent to 80 grams per liter of nickel and containing one gram per liter $Cr^{2+}$ ions for one hour at 90° C. under a hydrogen overpressure of 500 psig. This precipitant contained 62.3% metallics and had a nickel to chromium ratio of approximately 80:1. In Tests 4 through 6 known selenium precitants were prepared as shown in Table I.

A nickel matte was leached at atmospheric pressures with aeration at a temperature of 85° C. for two hours at pH values between about 5 and 6.5 and in each test 2.5 grams per liter of metallics in the precipitant was added during the leach. The initial concentration of selenium in the leach slurry was 3.2 parts per million total selenium and the nickel concentration of the leach liquor was 88 grams per liter. The results of these tests are shown in Table I.

Reference to Table I confirms that the semimetallic nickel chromous precipitant is effective in lowering the selenium content of the nickel solution to below about 1 ppm whereas selemium precipitants commonly used in the art provide final selenium contents of 1.82 ppm or greater. Thus, the semimetallic nickel chromous precipitant of the present invention is at least 44% more effective in removing selenium from solution.

two hours with the precipitant being added at a rate of two gpl of the metallics in the precipitant. The results of these tests are shown in Table II.

TABLE II

| Cr(II) Addition in SRC Preparation (gpl) | Ni:Cr | Terminal Se-Conc., ppm |
|---|---|---|
| 0.00 | — | 2.92 |
| 0.05 | 1600 | 2.81 |
| 0.10 | 800 | 2.76 |
| 0.50 | 400 | 1.85 |
| 1.00 | 80 | 0.61 |
| 2.00 | 40 | 0.55 |
| 5.00 | 16 | 0.56 |

The results in Table II show that even small amounts of chromium are effective in lowering the selenium content of the nickel solution. However, only those precipitants having a nickel to chromium ratio less than 400:1 provide terminal selenium concentrations in the nickel solution of less than 1 ppm.

EXAMPLE III

This example demonstrates the importance of employing semimetallic nickel chromous precipitates. Four semimetallic nickel chromous precipitants were precipitated from a nickel sulfate solution containing 80 gpl nickel and 1 gpl Cr(II) ion under a hydrogen overpressure of 300 psig for 30 minutes. The reduction temperature was varied between 90° C. and 180° C. to affect the metallic content of the precipitant. The precipitant so produced was used to remove selenium from a nickel sulfate solution containing 60 gpl nickel and 3.7

TABLE I

| Test No. | Precipitant Preparation | % Metallics In Compound | Terminal Se-Conc.,ppm | Terminal Ni/Se Ratio |
|---|---|---|---|---|
| 1. | SRC-prepared from 80 gpl $NiSO_4$ soln. containing 1 gpl $Cr^{++}$ at 90° C. for 30 minutes under 500 psig $H_2$. | 75.6 | 0.55 | $1.6 \times 10^5$ |
| 2. | SRC-prepared from 100 gpl Ni slurry of 6 $Ni(OH)_2 \cdot NiSO_4$ containing 1 gpl $Cr^{++}$ at 90° C. for 1 hour under 500 psig $H_2$. | 78.6 | 0.85 | $1.0 \times 10^5$ |
| 3. | SRC-prepared from 80 gpl slurry of $Ni(OH)_2 \cdot NiCO_3$ containing 1 gpl $Cr^{++}$ at 90° C. for 15 minutes under 450 psig $H_2$. | 62.3 | 1.01 | $0.9 \times 10^5$ |
| 4. | Metallic nickel prepared from 80 gpl $NiSO_4$ in presence of $Fe^{++} - Al^{+++}$ catalyst at 80° C. for 15 minutes under 500 psig $H_2$. | 95.6 | 1.82 | $0.5 \times 10^5$ |
| 5. | Densified metallic nickel powder produced with a wet reduction with $H_2$ at 180° C. for 30 minutes. | 99.9 | 3.01 | $0.3 \times 10^5$ |
| 6. | Metallic copper powder produced by reduction with $SO_2$ gas at 180° C. | 98.7 | 3.05 | $0.3 \times 10^5$ |

EXAMPLE II

This example demonstrates the greater effectiveness of semimetallic nickel chromous percipitants containing lower nickel to chromium ratios. Seven semimetallic nickel chromous precipitants were precipitated from a nickel sulfate solution containing 80 gpl nickel and various amounts of $Cr^{2+}$ ions at 90° C. for 30 minutes under a hydrogen overpressure of 500 psig. These precipitants were then used to precipitate selenium from a nickel sulfate solution containing 85 gpl nickel and 3 ppm total selenium at 90° C. under an unoxidizing condition for ppm selenium with aeration at 80° C. for two hours with the precipitant being added to the nickel solution at a rate equivalent to 2 gpl metallics in the precipitant. The results of these tests are shown in Table III.

TABLE III

| SRC Prep. Temperature (°C.) | % Metallics In SRC | Terminal Se-Conc. ppm |
|---|---|---|
| 90 | 75.6 | 0.72 |
| 120 | 91.5 | 0.90 |
| 150 | 98.7 | 2.4 |

TABLE III-continued

| SRC Prep. Temperature (°C.) | % Metallics In SRC | Terminal Se-Conc. ppm |
| --- | --- | --- |
| 180 | 99.2 | 3.0 |

Comparison of the results shown in Table III shows that acceptable terminal selenium concentrations can be obtained when the semimetallic nickel chromous precipitant contains about 92% metallics whereas metallics exceeding 95% produce commercially unacceptable terminal selenium concentrations of 2.4 greater.

EXAMPLE IV

This example demonstrates that higher temperatures and longer times of selenium precipitation are more effective in providing a low terminal selenium concentration. A semimetallic nickel chromous precipitant was precipitated from a nickel sulfate solution containing 80 gpl nickel and 1 gpl Cr(II) ion at 90° C. under a hydrogen overpressure of 400 psig for 30 minutes. The precipitant so produced was used to treat a nickel sulfate solution having a total selenium content of 4.5 ppm. During selenium precipitation the nickel sulfate solution was aerated and the precipitant was used at a rate equivalent to 3 gpl metallics in the precipitant. The times, temperatures and the results of these tests are reported in Table IV.

TABLE IV

| Time | Temperature (°C.) | Terminal Se-Conc.(ppm) |
| --- | --- | --- |
| 1 | 75 | 1.1 |
| 2 | 75 | 1.0 |
| 3 | 75 | 0.9 |
| 4 | 75 | 0.9 |
| 2 | 20 | 1.2 |
| 2 | 45 | 1.0 |
| 2 | 70 | 1.0 |
| 2 | 95 | 0.9 |

The results shown in Table IV confirm that longer precipitation times are effective in producing lower terminal selenium concentrations. However, at a given temperature, times in excess of one hour are only marginally better than those for 1 hour. The results in Table IV also demonstrate that higher temperatures are more effective in providing lower terminal selenium concentrations. Again, the effects of temperature above 45° C. produce only marginally better results. The results in Table IV demonstrate that optimal selenium removal can be achieved by conducting the selenium precipitation operation at temperatures between 50° C. and the boiling point of the solution for a time between about 1 and 2 hours.

EXAMPLE V

This example confirms that copper-bearing electrolytes can be treated by the process in accordance with the present invention to produce electrolytes having low selenium contents.

A semi-metallic nickel chromous precipitant was made from a nickel sulfate solution containing 80 gpl nickel and 1 gpl chromous ion at 90° C. under a hydrogen overpressure of 400 psig. A copper-bearing electrolyte containing between about 40 gpl and about 50 gpl nickel, between about 60 gpl and about 70 gpl copper, between about 2 gpl and about 4 gpl iron and between about 10 ppm and 15 ppm selenium was treated with a precipitant to remove selenium therefrom. Selenium was removed from this solution at ambient pressure at 65° C. for one hour. The results are reported in Table 5.

TABLE V

| Solution | Ni-Cr Addition gpl (100% Ni base) | Initial Se ppm | Terminal Se, ppm |
| --- | --- | --- | --- |
| I | 6.0 | 9.9 | 0.52 |
| II | 10.0 | 14.6 | 0.10 |

Substantially complete selenium removal was effected by these tests. In copper electrolytes containing selenium both in the hexavalent and quadravalent states in which the major part is present in the hexavalent state (70% to 90%), consumption of the precipitant was reduced to between about 0.6 and about 0.7 gpl precipitant per ppm selenium removed.

Although the present invention has been described in conjunction with preferred embodiments, it is to be understood that modifications and variations may be resorted to without departing from the scope of the invention, as those skilled in the art will readily understand. Such modifications and variations are considered to be within the purview and scope of the invention and appended claims.

We claim:

1. A process for precipitating selenium from solutions of nonferrous metals wich comprises contacting a solution of at least one nonferrous metal selected from the group consisting of cobalt, copper and nickel with a semimetallic chromous precipitant of the nonferrous metal which has a nonferrous metal to chromium ratio between about 10:1 and about 200:1 and which has a metallic content between about 50% and about 90% to precipitate selenium from the solution as a selenide of the nonferrous metal.

2. A process for precipitating selenium from nickel-containing solutions which comprises contacting the nickel solution with a semimetallic nickel chromous precipitant which has a nickel to chromium ratio between about 10:1 and about 200:1 and which has a metallic content between about 50% and about 90% to precipitate selenium from the nickel solutions as nickel selenide.

3. The process as described in claim 2 wherein the nickel-containing solution is at least one solution selected from the group consisting of nickel sulfate and nickel amine sulfate.

4. The process as described in claim 3 wherein the nickel containing solution has a nickel concentrate between about 10 gpl and about 120 gpl.

5. The process as described in claim 4 wherein the nickel solution contains between about 2 ppm and about 40 ppm selenium.

6. The process as described in claim 5 wherein the selenium concentrate is between about 3 ppm and about 6 ppm.

7. The process as described in claims 2 through 6 wherein the semimetallic nickel chromous precipitant is produced by treating a nickel solution or a nickel slurry containing a water-soluble chromium salt in an amount sufficient to provide a nickel to chromium ratio between about 10:1 and about 200:1 with a reducing gas selected from the group consisting of carbon monoxide and hydrogen at a temperature between about 50° C. and about 200° C. using a reducing gas under pressure between about 100 psig and about 800 psig.

8. The process as described in claim 7 wherein the nickel-containing solution or slurry is treated at a temperature between about 80° C. and about 100° C. with a reducing gas under pressure between about 300 psig and about 600 psig.

9. The process as described in claim 8 wherein a nickelcontaining solution is treated to produce a semimetallic nickel chromous precipitant and free acid generated during producing of the precipitant is neutralized with a neutralizing reagent.

10. The process as described in claim 7 wherein the effectiveness of the semimetallic nickel chromous precipitant is improved by adding at least one reagent selected from the group consisting of ferric ions, aluminum ions, silver ions, sulfide ions, cyanide ions, alizarin, polyacrylic acids and anthraquinone in amounts between about 50 ppm and about 200 ppm.

* * * * *